UNITED STATES PATENT OFFICE.

WILLIAM M. JEWELL, OF CHICAGO, ILLINOIS.

METHOD OF PURIFYING WATER.

SPECIFICATION forming part of Letters Patent No. 718,465, dated January 13, 1903.

Application filed January 8, 1900. Serial No. 757. (No specimens.)

*To all whom it may concern:*

Be it known that I, WILLIAM M. JEWELL, a citizen of the United States, residing at Chicago, in the county of Cook and State of Illinois, have invented a certain new and Improved Method of Purifying Water, of which the following is a specification.

My invention relates to methods of purifying water for potable purposes, and has particularly to do with the purification of water in large quantities for supplying cities, towns, and villages by the use of filters in which a filter-bed of sand or other granular material is provided through which the water is caused to pass either by gravity or under pressure for the removal of its impurities. In the treatment of most waters the simple passage of the water through the granular filter-bed is not sufficient to effectually purify it, and it has therefore been customary to introduce into the water to be purified a small quantity of a coagulant, which is dissolved in the water to be treated and after entering into solution reacts upon the matter contained in the water, forming a flocculent precipitate which effects the agglomeration of the suspended impurities in the water and increases their bulk, so that they cannot pass through the filter-bed, but are retained therein, so that the water which passes through the filter-bed is made much purer than it would be if the coagulant were not used. Inasmuch, however, as where a coagulant is used a greater proportion of the impurities is removed from the water and retained in the filter-bed, which also retains all the precipitated coagulant, the filter-bed becomes clogged much more quickly than where a coagulant is not used, impeding filtration and interfering with the proper purification of the water. It therefore becomes necessary at more or less frequent intervals to wash the filter-bed, which is accomplished by reversing the flow of water through it—that is to say, causing the water from the water-supply to rise through the filter-bed and pass out at the top of the filter-tank—by which operation the filter-bed is thoroughly loosened up, so that all impure matter is released and washed out, the wash-water being discharged into the sewer. The coagulant almost universally used hitherto has been common alum, although various other chemicals have been employed to a limited extent. In the further description of my improved process, however, I shall refer only to alum or sulfate of alumina, although it will be understood that the process is also applicable where other coagulants are employed.

One of the chief obstacles to the installation of municipal plants for the filtration of water has been the cost of operation, and of this amount by far the largest item is the cost of the coagulant, the average relative cost of the coagulant being about seventy per cent. of the total cost of operation. For example, an average grade of river-water requires from one to five grains of sulfate of alumina per gallon of water filtered, a fair average amount for a year's operation being about two grains per gallon. A city waterworks plant of twenty million gallons daily capacity requires, therefore, five thousand seven hundred and twenty-two pounds per day of sulfate of alumina, which at present market prices costs from eighty to eighty-five dollars, while the total cost of operating such a plant would be in the neighborhood of one hundred and twenty dollars per day. If some other coagulant than alum were used, the cost of the coagulant would vary, depending upon the amount required and the cost of the coagulant; but in any event the cost of the coagulant is ordinarily much the greater part of the total cost of operation.

The object of my present invention is to provide a method of purifying water by the use of granular filters by which the cost of operation will be greatly reduced, making it possible to operate filtration plants of this character at much less expense, and thereby making practicable their introduction in many municipalities from which they have heretofore been barred by reason of the great expense of operating them.

As has heretofore been stated, it has been the practice to permit the wash-water, which contains all the precipitated matter, including the coagulant, to flow from the filter-tank into the sewer. I have discovered, however, that by adding to the wash-water obtained by reversing the flow of water through the filter-bed, as described, a suitable solvent of the precipitated coagulant the latter may be again placed in solution and after separating from the solution the suspended impurities be reused, as in the first instance, with the water to be purified to coagulate the impurities contained in it.

My invention therefore contemplates the addition to the wash-water obtained as described of a suitable substance capable of effecting the solution of the precipitated coagulant and afterward conducting the solution to the water to be purified.

My invention also contemplates the additional step of removing from the solution all or the greater part of the suspended matter originally contained in the wash-water, either by sedimentation or filtration, before conducting said solution to the water to be purified. Where common alum or sulfate of alumina is used as the coagulant, the flocculent precipitate consists of hydrate of alumina, which is retained in the filter-bed and is washed out with the wash-water. To recover the coagulant, a sufficient quantity of a suitable acid or other solvent of hydrate of alumina is added to the wash-water to cause the hydrate to enter into solution. The solvent, however, is not added in any great excess. This operation is best carried out by providing suitable reservoirs for the storage of the wash-water, which flows thereinto from the filters and is there treated with the solvent. By thus providing reservoirs not only is sufficient time allowed for dissolving the hydrate of alumina, but also the suspended matter in the wash-water is allowed to subside, leaving as a supernatant liquid the clear solution of a salt of alumina, the character of the salt of alumina produced being dependent, of course, upon the acid or other chemical employed for its solution. In practice sulfuric or sulfurous acids are best employed, although nitric or hydrochloric acids or caustic soda or potash may be used, as well as other suitable acids or alkalies. The use of sulfurous acid I have, however, found to be very economical, as it can readily be generated by the combustion of sulfur and then introduced into the wash-water. After the coagulant has been fully dissolved and the suspended impurities have subsided the supernatant liquid is conducted to the water to be purified and fed thereinto, where it performs the same functions as those originally performed by it.

In using sulfurous acid, as above described, about one thousand pounds of sulfur are required to produce enough sulfurous acid to dissolve five hundred and sixty-five pounds of aluminium. The quantity of other reagents used may readily be determined by first estimating the quantity of aluminium contained in the wash-water and reckoning the amount of the reagent necessary to effect the chemical combination between the reagent and the salt of alumina.

In practice it is not necessary or advisable to treat all the wash-water, as practically all the coagulant will be carried out in the first flow of wash-water from the filter-tank, so that after the first few minutes of washing the remainder of the wash-water may be discharged into the sewer, as it will contain only a very small quantity of aluminium hydrate, if any. Neither is it necessary to remove from the wash-water all the suspended impurities contained in it, as ordinarily it is sufficient to remove only the heavier impurities, and the claims should be interpreted accordingly.

If desired, two reservoirs or basins for the collection, treatment, and sedimentation of the wash-water may be employed, said reservoirs being used alternately, so that the supply of coagulant may be derived from one of said reservoirs while the wash-water in the other is being treated.

As a result of my improved method of treatment I am enabled to save fully one-half the cost of the coagulant over processes heretofore employed, reducing the cost in the illustration given from one hundred and twenty dollars per day to eighty dollars per day, being a reduction of at least one-third of the entire cost of operation, an amount sufficient to make practical the introduction of filtration plants in many municipalities where the cost of operation has heretofore been prohibitive.

I am aware that it has heretofore been proposed to redissolve coagulated matter in the form of a magma; but so far as I am aware it has not heretofore been attempted to treat the wash-water obtained by reversing the flow of water through a granular filter-bed for the recovery of the coagulant carried by it.

That which I claim as my invention, and desire to secure by Letters Patent, is—

1. A method of purifying water consisting of adding a suitable coagulant to the water to be filtered, passing the water containing the coagulant through a granular filtering-bed so that the bed will take up the coagulant, then passing water through the granular bed in an opposite direction to that of the passage of water containing the coagulant to remove the coagulant from the filtering-bed, treating the wash-water with sulfurous acid to dissolve the precipitated coagulant, and then reconducting the redissolved coagulant to another charge of water adapted to be passed through the granular filtering-bed.

2. A method of purifying water consisting of adding a suitable coagulant to the water to be filtered, passing the water containing the coagulant through a granular filtering-bed so that the bed will take up the coagulant, then passing water through the granular bed in an opposite direction to that of the passage of water containing the coagulant to remove the coagulant from the filtering-bed, treating water with a solvent to dissolve the precipitated coagulant, and then reconducting the redissolved coagulant to another charge of water adapted to be passed through the granular filtering-bed.

WILLIAM M. JEWELL.

Witnesses:
JOHN L. JACKSON,
ALBERT H. ADAMS.